US011157699B2

United States Patent
Wang et al.

(10) Patent No.: US 11,157,699 B2
(45) Date of Patent: Oct. 26, 2021

(54) INTERACTIVE METHOD AND APPARATUS BASED ON TEST-TYPE APPLICATION

(71) Applicant: BEIJING BAIDU NETCOM SCIENCE AND TECHNOLOGY CO., LTD., Beijing (CN)

(72) Inventors: Chaoyue Wang, Beijing (CN); Ke Sun, Beijing (CN); Shiqi Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 367 days.

(21) Appl. No.: 15/926,019

(22) Filed: Mar. 20, 2018

(65) Prior Publication Data

US 2018/0373702 A1 Dec. 27, 2018

(30) Foreign Application Priority Data

Jun. 27, 2017 (CN) ........................ 201710500163.X

(51) Int. Cl.
*G09B 7/02* (2006.01)
*G06F 40/30* (2020.01)
(Continued)

(52) U.S. Cl.
CPC .......... *G06F 40/30* (2020.01); *G06F 3/04842* (2013.01); *G09B 7/02* (2013.01); *G09B 7/04* (2013.01)

(58) Field of Classification Search
CPC .... G09B 7/00; G09B 7/02; G09B 7/04; G06F 3/04842
See application file for complete search history.

(56) References Cited

U.S. PATENT DOCUMENTS 6,334,192 B1 * 12/2001 Karpf .................... G16H 50/20 714/1
8,006,097 B2 8/2011 Kumhyr et al.
(Continued)

FOREIGN PATENT DOCUMENTS

CN 101515958 8/2009
CN 102426567 4/2012
(Continued)

OTHER PUBLICATIONS

SIPO, First Office Action to CN Application No. 201710500163.X, dated Feb. 3, 2020.
(Continued)

*Primary Examiner* — Peter R Egloff
(74) *Attorney, Agent, or Firm* — Hodgson Russ LLP

(57) ABSTRACT

The present disclosure provides an interactive method and apparatus based on a test-type application, The method includes: obtaining a pre-established knowledge graph including non-leaf nodes indicating test questions, lines indicating test answers and leaf nodes indicating test results; selecting an interactive question for the current round from the test questions indicated by the non-leaf nodes and displaying the interactive question in the dialog box; when a user inputs an interactive answer with respect to the interactive question in the dialog box, querying a matched target line in the lines connected to the non-leaf node corresponding to the interactive question for the current round according to the interactive answer of the current round, to determine the target node connected to the non-leaf node through the target line; and displaying a test result or a test question for the next round in the dialog box according to the target node.

6 Claims, 5 Drawing Sheets

(51) Int. Cl.

| | |
|---|---|
| ***G06F 3/0484*** | (2013.01) |
| ***G09B 7/04*** | (2006.01) |

(56) References Cited

U.S. PATENT DOCUMENTS

| | | | | |
|---|---|---|---|---|
| 2002/0119433 | A1* | 8/2002 | Callender | G09B 7/00 434/322 |
| 2009/0253112 | A1 | 10/2009 | Cao et al. | |
| 2011/0229867 | A1* | 9/2011 | Gough | G09B 7/02 434/323 |
| 2014/0193794 | A1* | 7/2014 | Olander, III | G09B 7/06 434/362 |
| 2016/0188574 | A1* | 6/2016 | Homma | G06N 20/00 704/9 |

FOREIGN PATENT DOCUMENTS

| | | |
|---|---|---|
| CN | 103324754 | 9/2013 |
| CN | 104917612 | 9/2015 |
| CN | 104978825 | 10/2015 |
| CN | 104995582 | 10/2015 |
| CN | 105335620 | 2/2016 |
| CN | 106663130 | 5/2017 |
| CN | 106776701 | 5/2017 |

OTHER PUBLICATIONS

"Design and implementation of a medical assistant diagnosis expert system", Applications of the Computer Systems, Dec. 2001.

* cited by examiner

INTERACTIVE METHOD AND APPARATUS BASED ON TEST-TYPE APPLICATION

CROSS-REFERENCE TO RELATED APPLICATIONS

This application is based on and claims priority to Chinese Patent Application No. 201710500163.X, filed on Jun. 27, 2017, the entire content of which is incorporated herein by reference.

FIELD

The present disclosure relates to the Internet technology field, and more particularly, to an interactive method and apparatus based on a test-type application.

BACKGROUND

With continuous development of Internet technology, users have higher and higher requirements for human-computer interaction and various test-type applications have mushroomed. In the related art, when a user launches a test-type application, a test question is displayed in the interface for the user to select an answer by clicking an option, so as to execute subsequent test process according to the selected answer. This kind of interaction is not flexible enough, and the user interaction is poor.

SUMMARY

The present disclosure aims to solve at least one of the technical problems existing in the related art to at least some extent.

Embodiments according to a first aspect of the present disclosure provide an interactive method based on a test-type application, including: obtaining a pre-established knowledge graph, in which the knowledge graph includes non-leaf nodes indicating test questions, lines indicating test answers and leaf nodes indicating test results; selecting an interactive question for a current round from the test questions indicated by the non-leaf nodes in the knowledge graph, and displaying the interactive question for the current round in a dialog box; when an interactive answer with respect to the interactive question for the current round is input in the dialog box, querying a matched target line in lines connected to a non-leaf node corresponding to the interactive question for the current round according to the interactive answer of the current round, to determine a target node connected to the non-leaf node through the target line; and displaying a test result or a test question for a next round in the dialog box according to the target node.

Embodiments according to a second aspect of the present disclosure provide an interactive apparatus based on a test-type application, including a processor and a memory configured to store one or more software modules executable by the processor, in which the one or more software modules include: an obtaining module, configured to obtain a pre-established knowledge graph, in which the knowledge graph includes non-leaf nodes indicating test questions, lines indicating test answers and leaf nodes indicating test results; an selecting module, configured to select an interactive question for a current round from the test questions indicated by the non-leaf nodes in the knowledge graph, and display the interactive question for the current round in a dialog box; a querying module, configured to, when an interactive answer with respect to the interactive question for the current round is input in the dialog box, query a matched target line in lines connected to a non-leaf node corresponding to the interactive question for the current round according to the interactive answer of the current round, to determine a target node connected to the non-leaf node through the target line; and a displaying module, configured to display a test result or a test question for a next round in the dialog box according to the target node.

Embodiments according to a third aspect of the present disclosure provide a computer device, which includes a memory, a processor, and a computer program stored in the memory and executable by the processor, which when executed by the processor, cause the processor to perform the interactive method based on a test-type application according to the first aspect of embodiments the present disclosure.

Embodiments according to a fourth aspect of the present disclosure provide a non-transitory computer-readable storage medium, stored thereon with computer programs that, when executed by a processor, perform the interactive method based on a test-type application according to the first aspect of embodiments the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of the present disclosure will become apparent and more easily to understand from the following descriptions of the embodiments of the present disclosure with reference to the drawings, in which.

DETAILED DESCRIPTION

Figure 1:
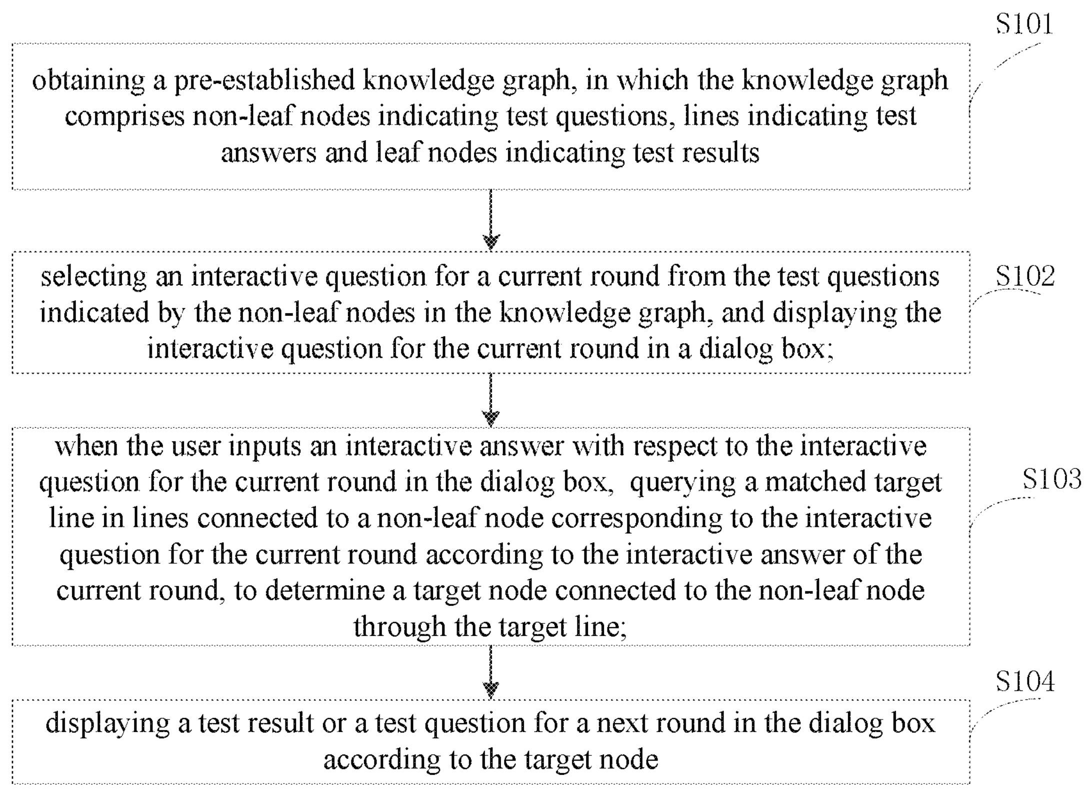
FIG. 1 is a flow chart illustrating an interactive method based on a test-type application according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

With respect to a problem of inflexible interactive manner and poor user interaction in the related art caused by a fact that when a user launches a test-type application, a test question is displayed in an interface for the user to select an answer by clicking an option, embodiments of the present disclosure display the test questions in a way of dialog and conversation so as to guide the user to input an interactive answer. Then the interactive answer input by the user is analyzed to determine an answer selected by the user from a plurality of answers to be chosen, and following tests are performed by querying a knowledge graph according to the selected answer, thus improving interaction between test-type applications and users and increasing flexibility of interactive manners.

The interactive method and apparatus based on a test-type application according to embodiments of the present disclosure will be described with reference to drawings as follows.

FIG. 1 is a flow chart illustrating an interactive method based on a test-type application according to an embodiment of the present disclosure.

The method according to embodiments of the present disclosure may be applied to a test-type application and used in various prediction scenarios. For example, the method may be used in a scenario of predicting preferable majors for recommending majors to a user. Alternatively, majors may be recommended based on both preference and learning ability (scores) of the user. For example, based on whether the user is interested in animals and plants or is interested in medicine, and then in combination with scholastic assessment test (SAT) scores and American college test (ACT) scores, a certain major or a major in a certain kind of colleges may be recommended to the user. Alternatively, the method may be applied to other prediction scenarios, and embodiments are not limited thereto.

As illustrated in FIG. 1, the interactive method based on a test-type application includes following acts.

At block S101, a pre-established knowledge graph is obtained, in which the knowledge graph includes non-leaf nodes indicating test questions, lines indicating test answers and leaf nodes indicating test results.

In this embodiment, the knowledge graph establishes a relationship network between test questions and interactive answers input by the user. During a test process, when any one of interactive questions is displayed, the knowledge graph may be queried according to an interactive answer provided by the user to obtain related interactive information for a next round, so as to accomplish the test.

Figure 2:
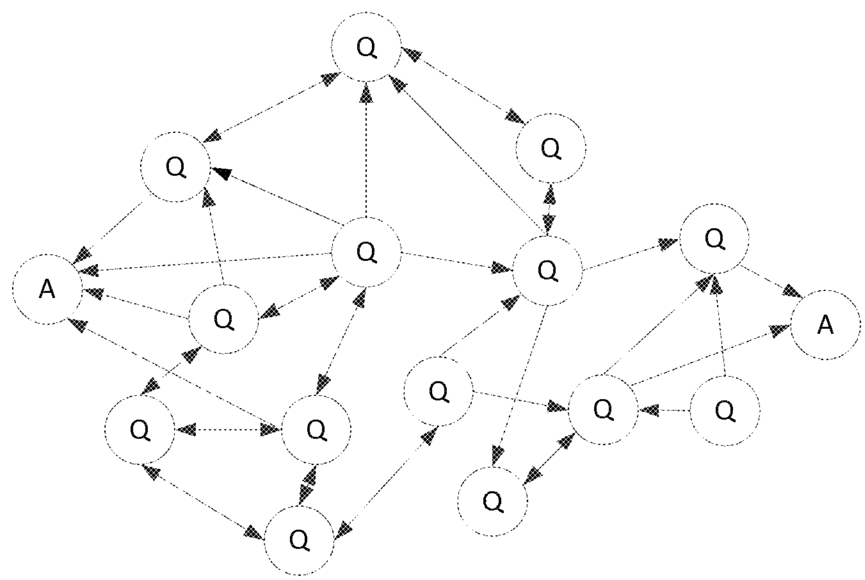
FIG. 2 is a schematic diagram illustrating a knowledge graph according to an embodiment of the present disclosure.

As an example, referring to FIG. 2, FIG. 2 is a schematic diagram illustrating a knowledge graph according to an embodiment of the present disclosure. In detail, a letter Q refers to a non-leaf node, a letter A refers to a leaf node and an arrow represents a line. When any one of the interactive questions is displayed, the knowledge graph may be queried according to the interactive answer provided by the user to obtain related interactive information for the next round, i.e. to obtain a test question indicated by a next non-leaf node or to obtain a test result indicated by a next leaf node.

For example, in a scenario of predicting preferable majors for college, the test questions are used as non-leaf nodes, the test answers are used as lines and the majors are used as leaf nodes, and then a result of predicting majors is made according to the interactive answer input in a dialog box by the user.

In this step, the knowledge graph is established in advance and interactive logic configuration of the test application is achieved by configuring rules, thus achieving a dialog process. When the knowledge graph is changed, only the rules of test need to be changed, but new development is unnecessary, thus improving flexibility of configuration of the test knowledge graph, and solving the technical problem in the related art that the test question is fixed and new development is needed whenever the test knowledge graph is changed.

At block S102, an interactive question for a current round is selected from the test questions indicated by the non-leaf nodes in the knowledge graph, and displayed in a dialog box.

In the related art, the test question is initiated by the user, and since information input by the user is uncontrollable, the test usually cannot be continued and accomplished when the user suddenly changes a topic.

However, in embodiments of the present disclosure, the test question is initiated by the test-type application, which controls a range of sentences to some extent, such that the user is guided to accomplish the test process, thus guaranteeing accomplishment of the test and increasing interesting in the test.

Alternatively, the interactive question for the current round is prompted by a microphone of a terminal on which the test-type application installed and displayed in a dialog box, so that it is convenient for the user to read the interactive question, therefore improving convenience of obtaining information.

At block S103, when an interactive answer with respect to the interactive question for the current round is input in the dialog box, a matched target line is queried in lines connected to a non-leaf node corresponding to the interactive question for the current round according to the interactive answer of the current round, to determine a target node connected to the non-leaf node through the target line.

Alternatively, the user may input speech data by clicking a microphone icon provided in the dialog box. Then, using the VAD (Voice Activity Detection) technology, when the user stops talking, the speech collection is terminated. Or, the user may directly input text information in the dialog box, and when the user presses a “send” button or a “enter” key, it means that the user finishes inputting the interactive answer of the current round.

After the interactive answer for the current round is input by the user, the knowledge graph is queried and the matched target line is queried in the lines connected to the non-leaf node corresponding to the interactive question for the current ground according to the interactive answer of the current round. In detail, the matched target line may be determined from the lines connected to the non-leaf node corresponding to the interactive question for the current round by means of semantic matching, in which a test answer indicated by the target line is semantically matched with the interactive answer of the current round, so as to determine the target node connected to the non-leaf node through the target line.

Figure 3:
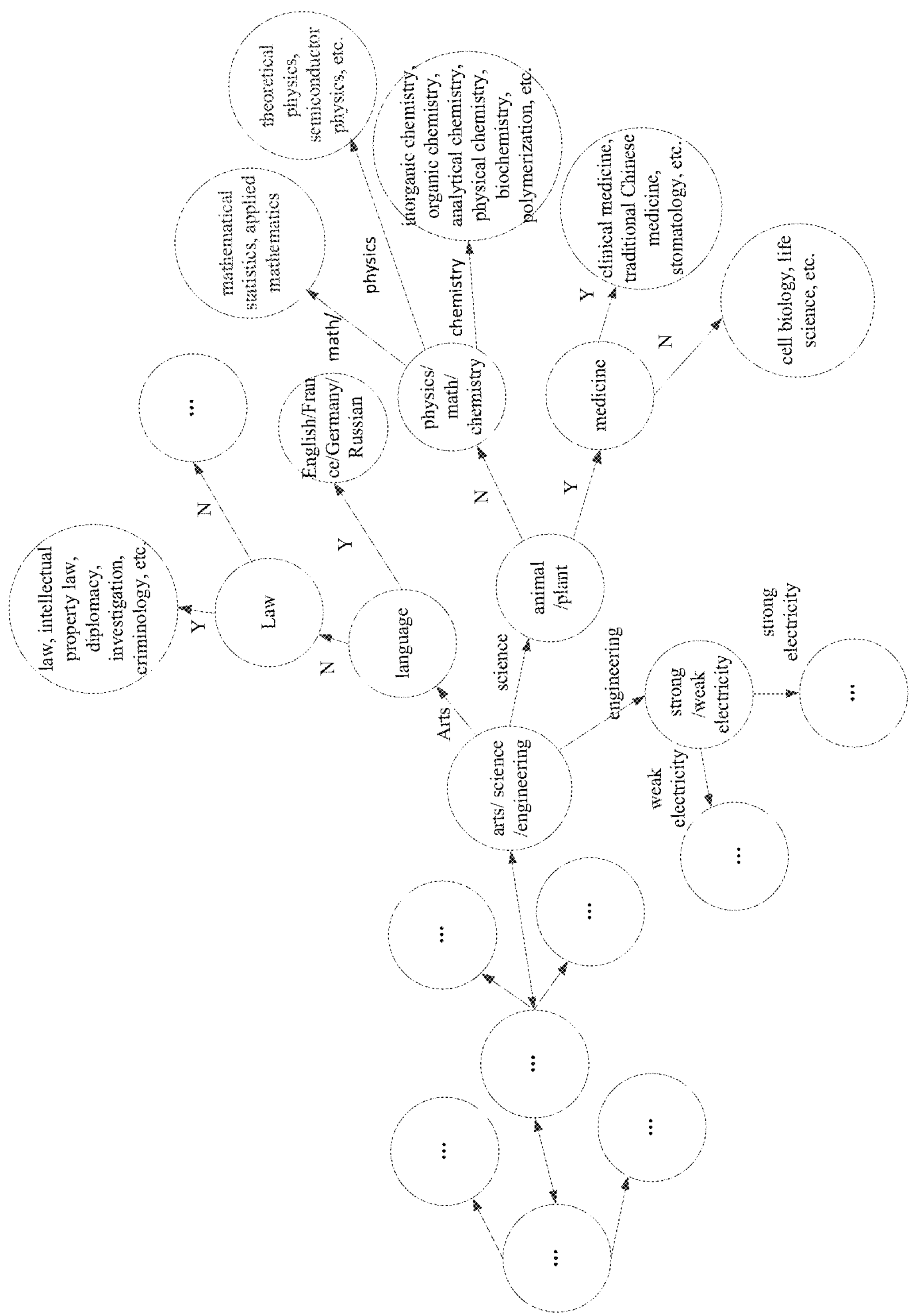
FIG. 3 is a schematic diagram illustrating a knowledge graph according to another embodiment of the present disclosure.

For example, in the scenario of predicting preferable majors for college, reference is made to FIG. 3, which is a schematic diagram illustrating a knowledge graph according to another embodiment of the present disclosure. The test question for the current round is “among physics, math and chemistry, which one do you like?”. When the interactive answer of the current round input by the user is “I like chemistry", it may be determined by semantically matching that among three lines which are connected to the node corresponding to the interactive question for the current round, a lowest line is the target line, i.e. the test answer indicated by the target line is "chemistry", and the test result is "inorganic chemistry, organic chemistry, analytical chemistry, physical chemistry, biochemistry, polymerization, etc."

At block S104, a test result or a test question for a next round is displayed in the dialog box according to the target node.

In detail, when the target node connected to the non-leaf node through the target line matching the interactive answer of the current round is a leaf node, it indicates that the test is finished and the test result is obtained, and at this time, the test result indicated by the target node may be displayed in the dialog box directly. When the target node connected to the non-leaf node through the target line matching the interactive answer of the current round is a non-leaf node, it indicates that the test is still going on and more questions may be provided to the user. In detail, the interactive question for the next round may be displayed in the dialog box according to a test question indicated by the target node.

For example, in the scenario of predicting preferable majors for college, referring to FIG. 3, the test question for the current round is "do you like language type of majors?". When the interactive answer of the current round input by the user is "Yes", i.e. the target node is a leaf node, recommended majors displayed in the dialog box include: law, intellectual property law, diplomacy, investigation, criminology, and the like. When the test question for the current round is "do you like language type of majors?", and the interactive answer of the current round input by the user is "No", i.e. the target node is a non-leaf node, the question for the next round may be displayed in the dialog box, for example, "do you like law type of majors?", thus guiding the user to answer a new question.

With the interactive method based on a test-type application according to embodiments of the present disclosure, the pre-established knowledge graph is obtained, the interactive question for the current round is selected from the test questions indicated by the non-leaf nodes and displayed in the dialog box. When the user inputs an interactive answer with respect to the interactive question for the current round in the dialog box, the matched target line is queried in the lines connected to the non-leaf node corresponding to the interactive question for the current round according to the interactive answer of the current round, to determine the target node connected to the non-leaf node through the target line. Then the test result or the test question for the next round is displayed in the dialog box according to the target node. Therefore, the interaction between the test-type application and the user are improved and interactive manner becomes more flexible.

Figure 4:
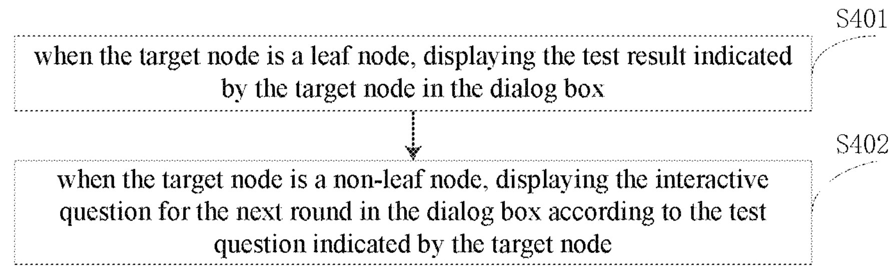
FIG. 4 is a flow chart illustrating an interactive method based on a test-type application according to another embodiment of the present disclosure.

For clear illustration of the above embodiment, referring to FIG. 4, on the basis of the embodiment illustrated in FIG. 1, block S104 further includes following sub-steps.

At block S401, when the target node is a leaf node, the test result indicated by the target node is displayed in the dialog box.

Since the leaf node is configured to indicate the test result, if the target node connected to the non-leaf node through the target line matching the interactive answer of the current round is a leaf node, it indicates that the test is finished, the test result is obtained, and the test result indicated by the target node is displayed in the dialog box directly.

At block S402, when the target node is a non-leaf node, the interactive question for the next round is displayed in the dialog box according to the test question indicated by the target node.

When the target node connected to the non-leaf node through the target line matching the interactive answer of the current round is a non-leaf node, it indicates that the test is still going on and more questions may be provided to the user. In detail, the interactive question for the next round may be displayed in the dialog box according to the test question indicated by the target node.

With the interactive method based on a test-type application according to embodiments of the present disclosure, by displaying the test result indicated by the target node in the dialog box when the target node is a leaf node and by displaying the interactive question for the next round in the dialog box according to the test question indicated by the target node when the target node is a non-leaf node, flexibility of the interactive manner may be further improved.

Figure 5:
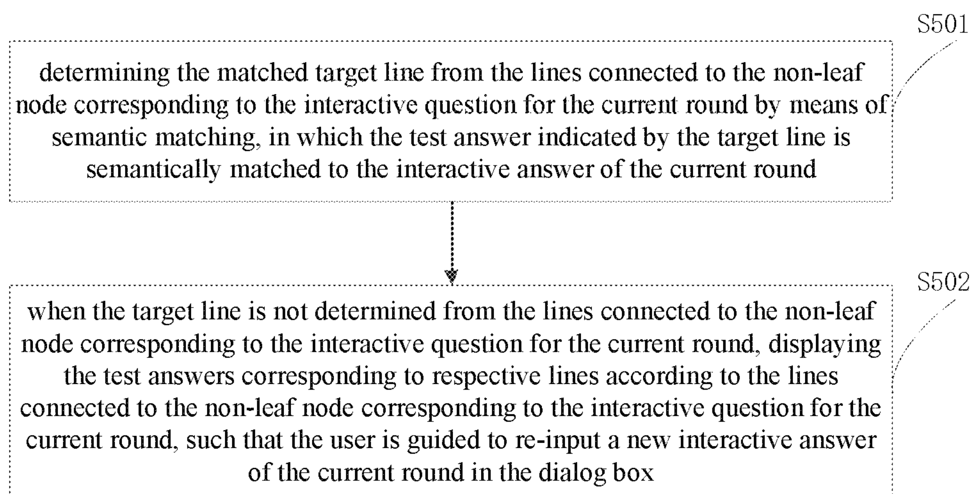
FIG. 5 is a flow chart illustrating an interactive method based on a test-type application according to yet another embodiment of the present disclosure.

For clear illustration of the above embodiment, referring to FIG. 5, on the basis of the embodiment illustrated in FIG. 1, querying a matched target line in lines connected to a non-leaf node corresponding to the interactive question for the current round according to the interactive answer of the current round further includes following sub-steps.

At block S501, the matched target line is determined from the lines connected to the non-leaf node corresponding to the interactive question for the current round by means of semantic matching, in which the test answer indicated by the target line is semantically matched to the interactive answer of the current round.

For example, the interactive answer of the current round may be segmented to obtain a segmentation result, and semantic matching may be performed with the test answers corresponding to respective lines according to the segmentation result, and then a matched line is taken as the target line.

At block S502, when the target line is not determined from the lines connected to the non-leaf node corresponding to the interactive question for the current round, the test answers corresponding to respective lines are displayed according to the lines connected to the non-leaf node corresponding to the interactive question for the current round, such that the user is guided to re-input a new interactive answer of the current round in the dialog box.

For example, referring to FIG. 3, the test question for the current round is "among physics, math and chemistry, which one do you like?". When the interactive answer of the current round input by the user is "I don't know", i.e. the target line is not determined from the lines connected to the non-leaf node corresponding to the interactive question for the current round, at this time, the test answers corresponding to respective lines may be displayed in the dialog box (i.e. "math", "physics" and "chemistry" are displayed) to guide the user to re-input an interactive answer of the current round in the dialog box according to the test answers corresponding to the lines, thus guaranteeing accomplishment of the test task.

With the interactive method based on a test-type application according to embodiments of the present disclosure, by using semantic matching, the matched target line is determined from the lines connected to the non-leaf node corresponding to the interactive question for the current round, in which the test answer indicated by the target line is semantically matched to the interactive answer of the current round. When the target line is not determined from the lines connected to the non-leaf node corresponding to the interactive question for the current round, the test answers corresponding to respective lines are displayed according to the lines connected to the non-leaf node corresponding to the interactive question for the current round, such that the user is guided to re-input a new interactive answer of the current round in the dialog box, thus guaranteeing accomplishment of the test task and increasing interesting in the test.

Figure 6:
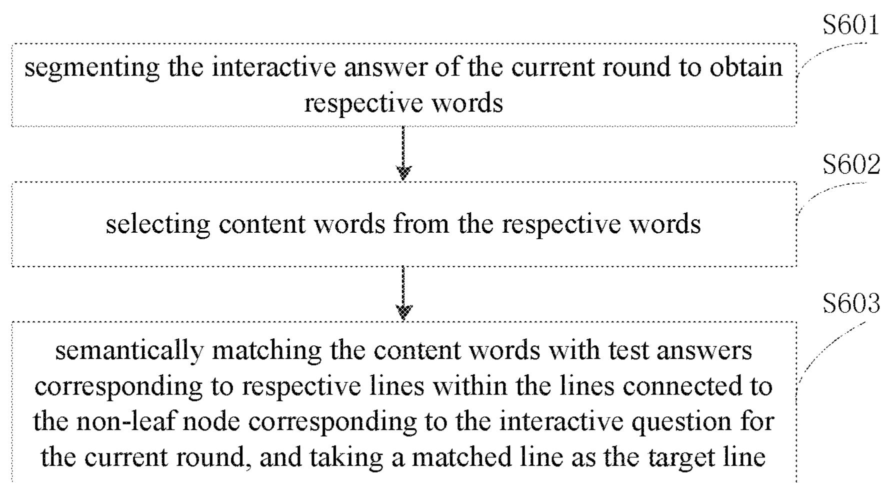
FIG. 6 is a flow chart illustrating an interactive method based on a test-type application according to still another embodiment of the present disclosure.

For clear illustration of the above embodiment, referring to FIG. 6, on the basis of the embodiment illustrated in FIG. 5, block S501 further includes following sub-steps.

At block S601, the interactive answer of the current round is segmented to obtain respective words.

In this embodiment, the interactive answer of the current round is segmented according to technologies in the related art to obtain morphologic information of the interactive answer of the current round, i.e. the respective words.

It should be noted that, by segmentation processing, words having same beginning and ending may be filtered out. When the user input is speech data, blurring sounds with same spell may also be filtered out to obtain words different from each other, thus increasing processing efficiency.

For example, referring to FIG. 3, the test question for the current round is "among physics, math and chemistry, which one do you like?", and the interactive answer of the current round input by the user is "Oh, I like chemistry". With segmentation of the interactive answer of the current round, words of: "I", "like", "chemistry" and "oh" may be obtained.

At block S602, content words are selected from the respective words.

In this embodiment, the content word refers to a word which serves as a meaningful component in a sentence, for example, a predicate verb, a noun, and the like. It should be understood that the respective words obtained after segmentation processing include content words and function words, in which the function words refer to words that only function as the connection in the sentence, for example, prepositions, articles and the like.

In an embodiment, the content words that can reflect the main idea of the interactive answer of the current round are selected from the respective words obtained after the segmentation processing according to the part of speech.

Still taking the above example, the respective words include "I", "like", "chemistry" and "oh", and the content words in the respective words are "I", "like", "chemistry" since "oh" is a modal particle, i.e., a function word.

At block S503, the content words are semantically matched with test answers corresponding to respective lines within the lines connected to the non-leaf node corresponding to the interactive question for the current round, and a matched line is taken as the target line.

Still taking the above example, the content words in the respective terms are "I", "like", "chemistry". Words "I", "like", "chemistry" are semantically matched with test answers corresponding to respective lines within the lines connected to the non-leaf node corresponding to the interactive question for the current round. It may be determined that among three lines which are connected to the node corresponding to the interactive question for the current round, a lowest line is the target line, i.e. the test answer indicated by the target line is "chemistry", and the test result indicated by the target node is "inorganic chemistry, organic chemistry, analytical chemistry, physical chemistry, biochemistry, polymerization, etc.". Therefore, the recommendation result could be more accurate.

With the interactive method based on a test-type application according to embodiments of the present disclosure, the interactive answer of the current round is segmented to obtain respective words, content words are selected from the respective words, and the content words are semantically matched with test answers corresponding to respective lines within the lines connected to the non-leaf node corresponding to the interactive question for the current round, and then the matched line is taken as the target line, thus increasing accuracy of information obtained by the user.

Figure 7:
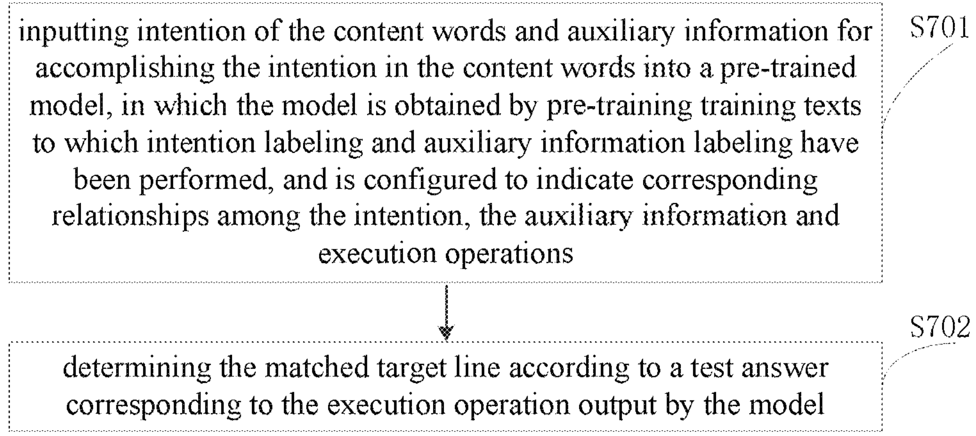
FIG. 7 is a flow chart illustrating an interactive method based on a test-type application according to still yet another embodiment of the present disclosure.

In a possible implementation of embodiments of the present disclosure, referring to FIG. 7, on the basis of the embodiment illustrated in FIG. 6, semantically matching the content words with the test answers corresponding to respective lines further includes following sub-steps.

At block S701, intention of the content words and auxiliary information for accomplishing the intention in the content words are input into a pre-trained model. The model is obtained by pre-training training text to which intention labeling and auxiliary information labeling have been performed, and is configured to indicate corresponding relationships among the intention, the auxiliary information and execution operations.

Since test models may vary for different test scenarios, the test model in a certain test scenario may be trained in advance according to the scenario, in which the model is configured to indicate corresponding relationships among the intention, the auxiliary information and execution operations.

For example, intention of the content words may include SAT, CAT, scores and the like, and auxiliary information for accomplishing the intention in the content words may include social ID number, hometown of the student, and the like.

Since the model is configured to indicate corresponding relationships among the intention, the auxiliary information and the execution operations, an execution operation corresponding to the intention and the auxiliary information may be obtained after the intention of the content words and auxiliary information for accomplishing the intention in the content words are input into the pre-trained model, and the matched target line may be determined according to a test answer corresponding to the execution operation. In detail, the execution operation may refer to a matched test answer, or in some scenarios may also refer to a matched test result.

At block S702, the matched target line is determined according to the test answer corresponding to the execution operation output by the model.

Alternatively, the matched target line is determined according to the test answer corresponding to the execution operation output by the model, which is easy to achieve and implement, thus improving accuracy and deficiency of the matching.

With the interactive method based on a test-type application according to embodiments of the present disclosure, the intention of the content words and auxiliary information for accomplishing the intention in the content words are input into the pre-trained model, and the matched target line is determined according to the test answer corresponding to the execution operation output by the model, which is each to achieve and implement, thus improving accuracy and deficiency of the matching.

To achieve the above embodiments, the present disclosure also provides an interactive apparatus based on a test-type application.

Figure 8:
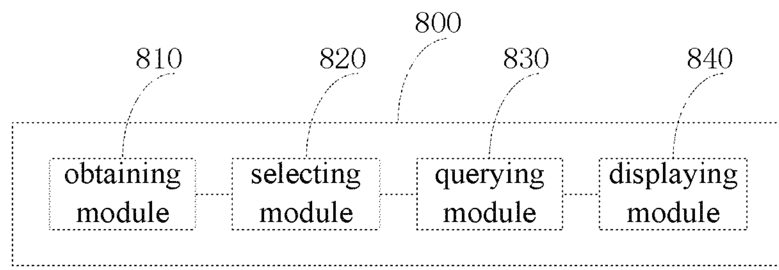
FIG. 8 is a block diagram of an interactive apparatus based on a test-type application according to an embodiment of the present disclosure.

FIG. 8 is a block diagram of an interactive apparatus based on a test-type application according to an embodiment of the present disclosure.

As illustrated in FIG. 8, the interactive apparatus 800 based on a test-type application includes an obtaining module 810, a selecting module 820, a querying module 830 and a displaying module 840.

The obtaining module 810 is configured to obtain a pre-established knowledge graph, in which the knowledge graph includes non-leaf nodes indicating test questions, lines indicating test answers and leaf nodes indicating test results.

The selecting module 820 is configured to select an interactive question for a current round from the test questions indicated by the non-leaf nodes in the knowledge graph, and display the interactive question for the current round in a dialog box.

The querying module 830 is configured to, when an interactive answer with respect to the interactive question for the current round is input in the dialog box, query a matched target line in lines connected to a non-leaf node corresponding to the interactive question for the current round according to the interactive answer of the current round, to determine a target node connected to the non-leaf node through the target line.

In a possible implementation of embodiments of the present disclosure, The querying module 830 is configured to determine the matched target line from the lines connected to the non-leaf node corresponding to the interactive question for the current round by means of semantic matching, in which the test answer indicated by the target line is semantically matched to the interactive answer of the current round.

Alternatively, the querying module 830 is further configured to, when the target line is not determined from the lines connected to the non-leaf node corresponding to the interactive question for the current round, display test answers corresponding to respective lines according to the lines connected to the non-leaf node corresponding to the interactive question for the current round, such that the user is guided to re-input a new interactive answer of the current round in the dialog box.

In a possible implementation of embodiments of the present disclosure, the querying module 830 is further configured to: segment the interactive answer of the current round to obtain respective words; select content words from the respective words; and semantically match the content words with test answers corresponding to respective lines within the lines connected to the non-leaf node corresponding to the interactive question for the current round, and take a matched line as the target line.

Alternatively, the querying module 830 is further configured to: input intention of the content words and auxiliary information for accomplishing the intention in the content words into a pre-trained model, in which the model is obtained by pre-training training texts to which intention labeling and auxiliary information labeling have been performed, and is configured to indicate corresponding relationships among the intention, the auxiliary information and execution operations; and determine the matched target line according to a test answer corresponding to the execution operation output by the model.

The displaying module 840 is configured to display a test result or a test question for a next round in the dialog box according to the target node.

In a specific implementation, the displaying module 840 is configured to display the test result indicated by the target node in the dialog box when the target node is a leaf node and display the interactive question for the next round in the dialog box according to the test question indicated by the target node when the target node is a non-leaf node.

It should be understood that the descriptions of the interactive method based on a test-type application in the above embodiments with reference to FIG. 1 to FIG. 7 may also be applied to the interactive apparatus 800 based on a test-type application according to embodiments of the present disclosure, which will not be elaborated here.

With the interactive apparatus based on a test-type application according to embodiments of the present disclosure, the pre-established knowledge graph is obtained, the interactive question for the current round is selected from the test questions indicated by the non-leaf nodes and displayed in the dialog box. When the user inputs an interactive answer with respect to the interactive question for the current round in the dialog box, the matched target line is queried in the lines connected to the non-leaf node corresponding to the interactive question for the current round according to the interactive answer of the current round, to determine the target node connected to the non-leaf node through the target line. Then the test result or the test question for the next round is displayed in the dialog box according to the target node. Therefore, the interaction between the test-type application and the user are improved and interactive manner becomes more flexible.

To achieve the above embodiments, the present disclosure also provides a computer device, which includes a memory, a processor, and a computer program stored in the memory and executable by the processor, which when executed by the processor, cause the processor to perform the interactive method based on a test-type application according to above embodiments.

To achieve the above embodiments, the present disclosure also provides a non-transitory computer-readable storage medium, stored thereon with computer programs that, when executed by a processor, perform the interactive method based on a test-type application according to above embodiments.

To achieve the above embodiments, the present disclosure also provides a computer program product, which when instructions stored in the computer program product is executed by a processor, performs the interactive method based on a test-type application according to above embodiments.

Figure 9:
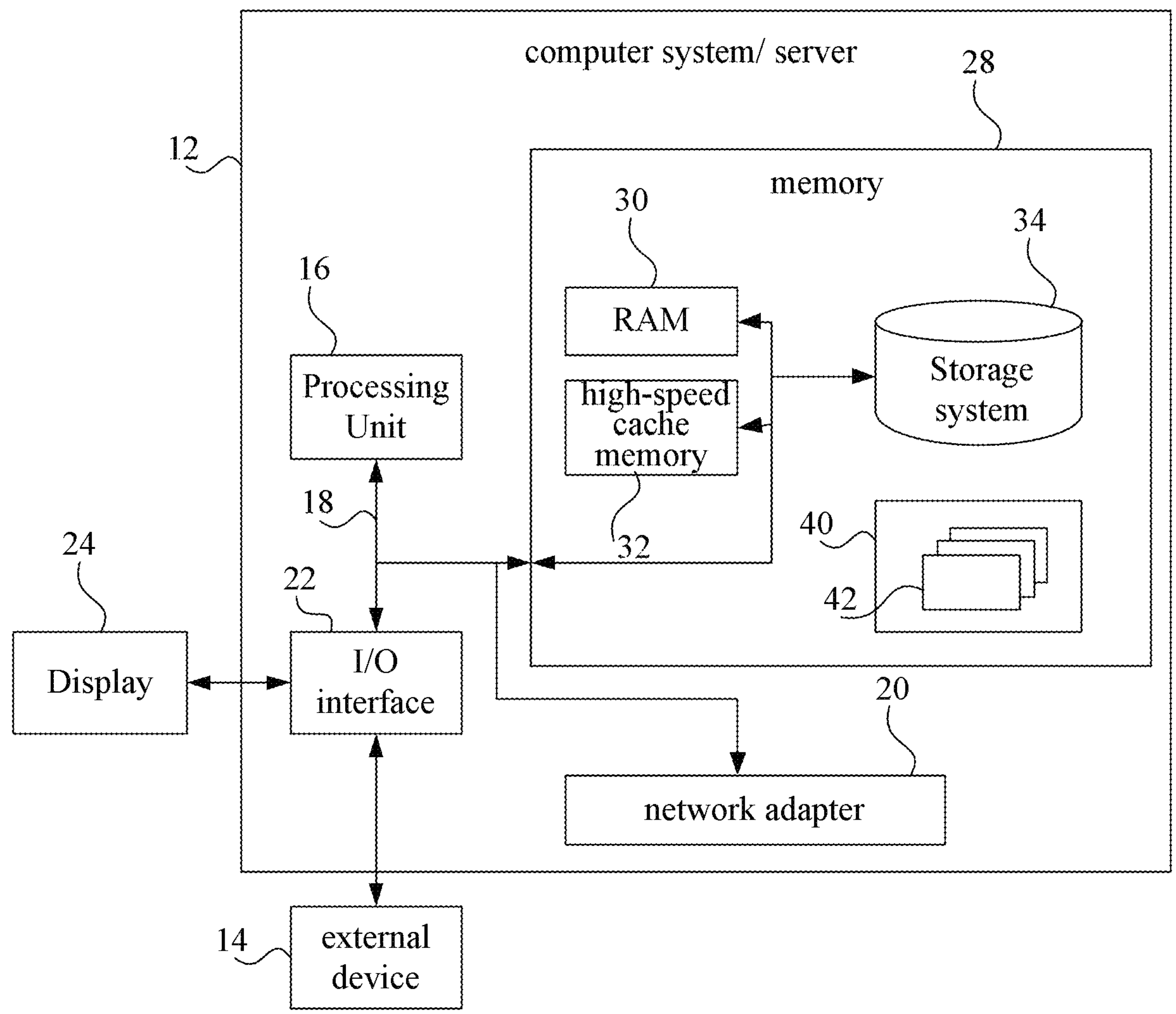
FIG. 9 is a block diagram of a computer device for implementing embodiments of the present disclosure.

FIG. 9 is a block diagram of a computer device for implementing embodiments of the present disclosure. The computer device 12 illustrated in FIG. 9 is only illustrated as an example, and should not be considered as any restriction on the function and the usage range of embodiments of the present disclosure.

As illustrated in FIG. 9, the computer device 12 is in the form of a general-purpose computing apparatus. The computer device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronic standards association (VESA) local bus, and a peripheral component interconnect (PCI) bus.

Typically, the computer device 12 may include multiple kinds of computer-readable media. These media may be any storage media accessible by the computer device 12, including transitory or non-transitory storage medium and movable or unmovable storage medium.

The memory 28 may include a computer-readable medium in a form of volatile memory, such as a random access memory (RAM) 30 and/or a high-speed cache memory 32. The computer device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 9, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The computer device 12 may also communicate with one or more external devices 14 (e.g., a keyboard, a pointing device, a display 24, and etc.) and may also communicate with one or more devices that enables a user to interact with the computer system/server 12, and/or any device (e.g., a network card, a modem, and etc.) that enables the computer system/server 12 to communicate with one or more other computing devices. This kind of communication can be achieved by the input/output (I/O) interface 22. In addition, the computer device 12 may be connected to and communicate with one or more networks such as a local area network (LAN), a wide area network (WAN) and/or a public network such as the Internet through a network adapter 20. As shown in FIG. 9, the network adapter 20 communicates with other modules of the computer device 12 over bus 18. It should be understood that although not shown in the figure, other hardware and/or software modules may be used in combination with the computer device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the method for interaction in above embodiments.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

In addition, terms such as "first" and "second" are used herein only for purposes of description and are not intended to indicate or imply relative importance or significance or to imply the number of indicated technical features. Thus, the feature defined with "first" and "second" may comprise one or more of this feature either in a way of imply or indicate. In the description of the present disclosure, "a plurality of" means two or more than two, for example, two, three, and the like, unless specifically and particularly prescribed otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated into a processing module, or these cells may be separate physical existence, or two or more cells are integrated into a processing module. The integrated module as described above may be achieved in a form of hardware, or may be achieved in a form of software functional module. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of the present disclosure have been shown and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. An interactive method based on a test-type application installed in a terminal, comprising:

selecting by the test-type application, a test question from non-leaf-nodes of a pre-established knowledge graph as an interactive question for a current round, wherein the knowledge graph comprises the non-leaf-nodes indicating test questions, lines indicating test answers and leaf nodes indicating test results;

displaying the interactive question for the current round in a dialog box;

prompting, by the test-type application, a user to input an interactive answer with respect to the interactive question for the current round in a form of speech via a microphone of the terminal by clicking a microphone icon provided in the dialog box, and receiving the interactive answer in the dialog box after the test-type application determines, using voice activity detection, that speech input by the user has terminated;

obtaining by the test-type application, lines connected to the non-leaf node corresponding to the interactive question from the pre-established knowledge graph;

segmenting by the test-type application, the interactive answer of the current round to obtain respective words;

selecting by the test-type application, content words from the respective words;

semantically matching by the test-type application, the content words with test answers corresponding to respective lines within the lines connected to the non-leaf node corresponding to the interactive question to obtain a matched target line;

determining by the test-type application, a target node connected to the non-leaf node through the target line;

in response to the target node being a leaf node, displaying by the test-type application, a test result indicated by the target node in the dialog box, and in response to the target node being a non-leaf node, displaying by the test-type application a next interactive question corresponding the target node for a next round in the dialog box;

wherein, the method further comprises:

when the target line is not determined from the lines connected to the non-leaf node corresponding to the interactive question for the current round, displaying by the test-type application, the test answers corresponding to respective lines connected to the non-leaf node corresponding to the interactive question for the current round, such that the user re-inputs a new interactive answer of the current round in the dialog box.

2. The interactive method according to claim 1, wherein, semantically matching the content words with test answers corresponding to respective lines comprises:

receiving test scores and auxiliary information of the content words from the user, and inputting the test scores and auxiliary information into a pre-trained model, wherein the model is obtained by pre-training a training text to which test scores labeling and auxiliary information labeling have been performed, and is configured to indicate corresponding relationships among the test scores, the auxiliary information and execution operations; and determining the matched target line according to a test answer corresponding to the execution operation output by the model.

3. An interactive apparatus based on a test-type application installed in a terminal, comprising:

a processor; and a memory, configured to store computer instructions executable by the processor, wherein the processor is configured to:

select a test question from non-leaf-nodes of a pre-established knowledge graph as an interactive question for a current round, wherein the knowledge graph comprises the non-leaf-nodes indicating test questions, lines indicating test answers and leaf nodes indicating test results;

display the interactive question for the current round in a dialog box;

prompt a user to input an interactive answer with respect to the interactive question for the current round in a form of speech via a microphone of the terminal by clicking a microphone icon provided in the dialog box and receive the interactive answer in the dialog box after the test-type application determines, using voice activity detection, that speech input by the user has terminated;

obtain lines connected to the non-leaf node corresponding to the interactive question from the pre-established knowledge graph;

segment the interactive answer of the current round to obtain respective words;

select content words from the respective words;

semantically match the content words with test answers corresponding to respective lines within the lines connected to the non-leaf node corresponding to the interactive question to obtain a matched target line; and determine a target node connected to the non-leaf node through the target line;

wherein the processor is further configured to:

when the target line is not determined from the lines connected to the non-leaf node corresponding to the interactive question for the current round, display the test answers corresponding to respective lines connected to the non-leaf node corresponding to the interactive question for the current round, the user re-inputs a new interactive answer of the current round in the dialog box.

4. The interactive apparatus according to claim 3, wherein the querying module is further configured to:

receive test scores and auxiliary information of the content words from the user, and input the test scores and auxiliary information into a pre-trained model, wherein the model is obtained by pre-training a training text to which test scores labeling and auxiliary information labeling have been performed, and is configured to indicate corresponding relationships among the test scores, the auxiliary information and execution operations; and determine the matched target line according to a test answer corresponding to the execution operation output by the model.

5. A non-transitory computer-readable storage medium, stored thereon with computer programs that, when executed by a processor, perform an interactive method based on a test-type application installed in a terminal, the interactive method comprising:

selecting by the test-type application, a test question from non-leaf-nodes of a pre-established knowledge graph as an interactive question for a current round, wherein the knowledge graph comprises the non-leaf-nodes indicating test questions, lines indicating test answers and leaf nodes indicating test results;

displaying the interactive question for the current round in a dialog box;

prompting, by the test-type application, a user to input an interactive answer with respect to the interactive question for the current round in a form of speech via a microphone of the terminal by clicking a microphone icon provided in the dialog box, and receiving by the interactive answer in the dialog box after the test-type application determines, using voice activity detection, that speech input by the user has terminated;

obtaining by the test-type application, lines connected to the non-leaf node corresponding to the interactive question from the pre-established knowledge graph;

segmenting by the test-type application, the interactive answer of the current round to obtain respective words;

selecting by the test-type application, content words from the respective words;

semantically matching by the test-type application, the content words with test answers corresponding to respective lines within the lines connected to the non-leaf node corresponding to the interactive question to obtain a matched target line;

determining by the test-type application, a target node connected to the non-leaf node through the target line;

in response to the target node being a leaf node, displaying by the test-type application, a test result indicated by the target node in the dialog box, and in response to the target node being a non-leaf node, displaying by the test-type application a next interactive question corresponding the target node for a next round in the dialog box;

wherein, the method further comprises:

when the target line is not determined from the lines connected to the non-leaf node corresponding to the interactive question for the current round, displaying by the test-type application, the test answers corresponding to respective lines connected to the non-leaf node corresponding to the interactive question for the current round, such that the user re-inputs a new interactive answer of the current round in the dialog box.

6. The non-transitory computer-readable storage medium according to claim 5, wherein, semantically matching the content words with test answers corresponding to respective lines comprises:

receiving test scores and auxiliary information of the content words from the user, and inputting the test scores and auxiliary information into a pre-trained model, wherein the model is obtained by pre-training a training text to which test scores labeling and auxiliary information labeling have been performed, and is configured to indicate corresponding relationships among the test scores, the auxiliary information and execution operations; and determining the matched target line according to a test answer corresponding to the execution operation output by the model.

* * * * *